(12) United States Patent
Stoyer et al.

(10) Patent No.: US 11,361,683 B2
(45) Date of Patent: Jun. 14, 2022

(54) MODULAR SIGN SYSTEM WITH A WIRELESS BACKPLANE AND RELATED METHODS

(71) Applicant: SKYLINE PRODUCTS, INC., Colorado Springs, CO (US)

(72) Inventors: Douglas Earl Stoyer, Colorado Springs, CO (US); Terry Lee Hansen, Colorado Springs, CO (US)

(73) Assignee: Skyline Products, Inc., Colorado Springs, CO (US)

( * ) Notice: Subject to any disclaimer, the term of this patent is extended or adjusted under 35 U.S.C. 154(b) by 0 days.

(21) Appl. No.: 15/283,690

(22) Filed: Oct. 3, 2016

(65) Prior Publication Data

US 2017/0099687 A1 Apr. 6, 2017

Related U.S. Application Data

(60) Provisional application No. 62/235,938, filed on Oct. 1, 2015.

(51) Int. Cl.
| | | |
|---|---|---|
| *G09F 9/302* | (2006.01) | |
| *H04W 84/20* | (2009.01) | |
| *H04L 12/44* | (2006.01) | |
| *H04L 41/0893* | (2022.01) | |
| *H04L 43/16* | (2022.01) | |
| *H04L 67/104* | (2022.01) | |

(52) U.S. Cl.
CPC ............ *G09F 9/3026* (2013.01); *H04L 12/44* (2013.01); *H04L 41/0893* (2013.01); *H04L 43/16* (2013.01); *H04L 67/104* (2013.01); *H04W 84/20* (2013.01)

(58) Field of Classification Search
CPC ... G09F 9/3026; H04L 12/44; H04L 41/0893; H04L 43/16; H04L 67/104; H04W 84/20
See application file for complete search history.

(56) References Cited

U.S. PATENT DOCUMENTS 5,990,802 A * 11/1999 Maskeny .................. G09F 9/33
340/815.42
7,262,708 B1 8/2007 Addicks
(Continued)

FOREIGN PATENT DOCUMENTS

CA 2944102 4/2017

OTHER PUBLICATIONS

IEEE Standard for Low-RateWireless Networks IEEE Std 802.15.4™—2015. pp. 1-707.*

*Primary Examiner* — Ahmed Elallam
(74) *Attorney, Agent, or Firm* — Messner Reeves LLP; Scott J. Hawranek

(57) ABSTRACT

Embodiments of a modular sign system with a wireless backplane and related methods are generally described herein. Many embodiments include a sign system. In some embodiments, the sign system can comprise a plurality of units, a wireless communication system configured to transfer information between the plurality of units, and a control device configured to transmit information to at least one unit of the plurality of units. In many embodiments, each unit of the plurality of units comprises a display of a plurality of displays, a controller of a plurality of controllers, and a transceiver of a plurality of transceivers. Other embodiments may be described and claimed.

18 Claims, 4 Drawing Sheets

(56) References Cited

U.S. PATENT DOCUMENTS

| | | | |
|---|---|---|---|
| 7,373,107 B1 | 5/2008 | Wesolowski | |
| 2001/0011971 A1* | 8/2001 | Kim | G06F 3/1423 |
| | | | 345/33 |
| 2003/0001796 A1* | 1/2003 | Wampler | G06F 3/1438 |
| | | | 345/2.1 |
| 2007/0112982 A1 | 5/2007 | Sichner et al. | |
| 2007/0188483 A1* | 8/2007 | Bonner | G09F 9/30 |
| | | | 345/204 |
| 2008/0104871 A1 | 5/2008 | Stadjuhar | |
| 2008/0198098 A1* | 8/2008 | Gelbman | G06F 3/147 |
| | | | 345/59 |
| 2009/0102748 A1* | 4/2009 | Stoyer | G09G 3/14 |
| | | | 345/33 |
| 2013/0117136 A1 | 5/2013 | Krawinkel | |
| 2014/0056028 A1* | 2/2014 | Nichol | G02B 6/0028 |
| | | | 362/611 |
| 2019/0018638 A1* | 1/2019 | Kreiner | G06F 3/1446 |

\* cited by examiner

MODULAR SIGN SYSTEM WITH A WIRELESS BACKPLANE AND RELATED METHODS

CROSS-REFERENCE TO RELATED APPLICATIONS

The present application claims priority to U.S. Provisional Patent Application No. 62/235,938, entitled "Modular Sign System and Method Having a Wireless Backplane," filed on Oct. 1, 2015, which is hereby incorporated by reference.

TECHNICAL FIELD

This disclosure relates generally to the field of signs, and more particularly to modular sign systems with wireless backplanes.

BACKGROUND

Variable message signs can be used to display warning and informational messages, fuel prices, advertisements and for information at sporting events. There is value to increasing the performance of these signs, while keeping down the cost. Customers prefer variable message signs that are customized for their location and needs. However, this customization can increase the costs associated with the variable message signs. Custom variable message signs can require custom circuit boards, physical frames, back planes, power supplies, customized controllers, etc. All of this can increase the cost of the variable message sign.

Thus there exists a need for a sign system that allows for customized signs that is inexpensive and allows for quick delivery.

BRIEF DESCRIPTION OF THE DRAWINGS

To facilitate further description of the embodiments, the following drawings are provided in which.

Figure 1:
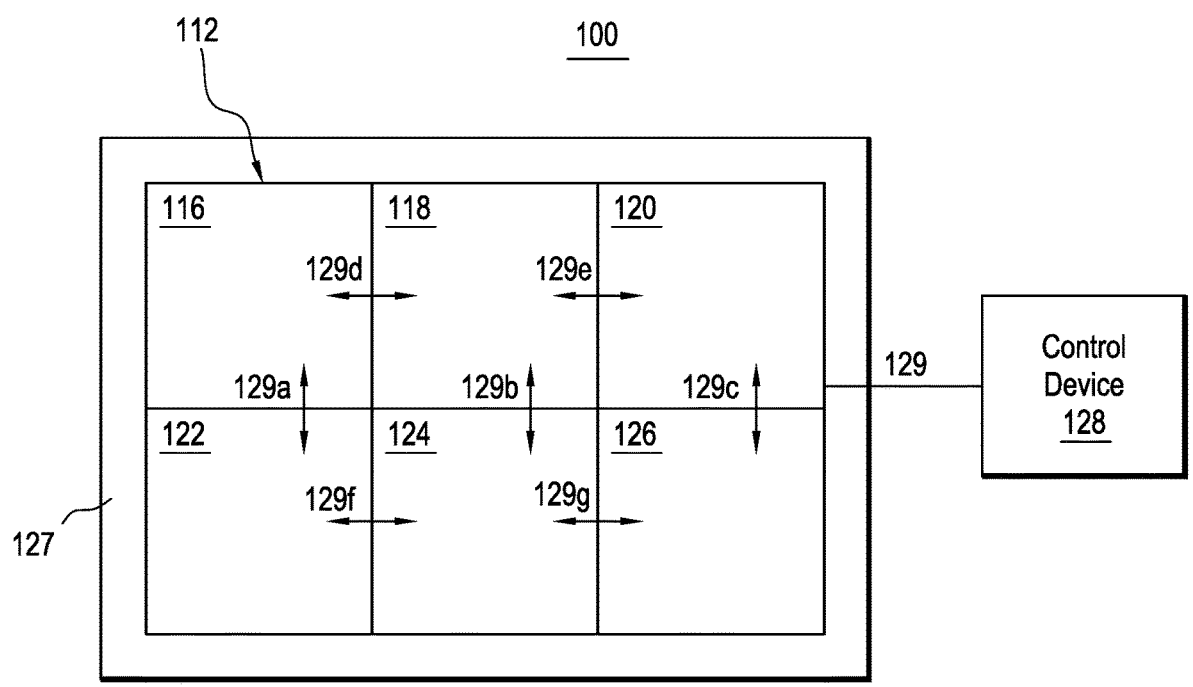
FIG. 1 illustrates a representative block diagram of a sign system in accordance with an embodiment of the invention.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Many embodiments include a sign system. In some embodiments, the sign system can comprise a plurality of units, a wireless communication system configured to transfer information between the plurality of units, and a control device configured to transmit information to at least one unit of the plurality of units. In many embodiments, each unit of the plurality of units comprises a display of a plurality displays, a controller of a plurality of controllers, and a transceiver of a plurality of transceivers.

Various embodiments comprise a sign system. In many embodiments, the sign system can comprise a plurality of units. In some embodiments, each of the plurality of units can comprise a display, a controller, and a transceiver. In many embodiments, the sign system can further comprise a first sign comprising a first subset of the plurality of units, a first wireless network connecting the first subset of the plurality of units, a second sign comprising a second subset of the plurality of units, a second wireless network connecting the second subset of the plurality of units, and a control device in communication with at least one unit of the plurality of units. In a number of embodiments, the second subset of the plurality of units is different from the first subset of the plurality of units. In the same or different embodiments, the second subset of the plurality of units is non-overlapping with the first subset of the plurality of units.

A number of embodiments comprise a method. In some embodiments, the method can comprise grouping a plurality of units into a sign and setting up a wireless network among the plurality of units. In various embodiments, the method can further comprise connecting a control device to the wireless network and selecting a master unit of the plurality of units.

Turning to the drawings, FIG. 1 illustrates an exemplary embodiment of a sign system 100. In many embodiments, sign system 100 can comprise a sign 112. In many embodiments, sign 112 can be a variable message sign (e.g., highway sign, traffic sign, sports sign, fuel price sign, or any other changeable message sign). In some embodiments, sign 112 can comprise a plurality of units (e.g., units 116, 118, 120, 122, 124, and 126). In various embodiments, units 116, 118, 120, 122, 124, and 126 can be held in a frame or structure 127 to form a single sign. In some embodiments, each unit of the plurality of units 116, 118, 120, 122, 124, and 126 is self-contained, and can act as a sign by itself In many embodiments, larger signs can be created by grouping all or a portion of the units 116, 118, 120, 122, 124, and 126 together to form a single sign. In some embodiments, sign 112 can comprise at least two units (e.g., units 116 and 118). In various embodiments, sign 112 can comprise hundreds of units. In some embodiments, a user can determine how many units are needed for sign 112. In some embodiments, fractional parts of one or more of the plurality of units 116, 118, 120, 122, 124, and 126 can be used to display information on sign 112. In one embodiment, each of units 116, 118, 120, 122, 124, and 126 can be selected for sign 112. In this embodiment, units 116 and 122 can be used to display the price of regular fuel, units 118 and 124 can be used to display the price of premium fuel, and units 120 and 126 can be used to display the price of diesel fuel.

In some embodiments, sign 112 can comprise a first portion of the plurality of units on a first side of sign 112 and a second portion of the plurality of units on a second side of sign 112. In some embodiments, sign 112 can comprise a same number of units on the first side of sign 112 as the number of units on the second side of sign 112. In some embodiments, the total size of the units on the first side of sign 112 is the same as the total size of the units on the second side of sign 112. In many embodiments, each of the plurality of units can be similar in dimension. In some embodiments, one or more units of the plurality of units can comprise different dimensions. In many embodiments, units 116, 118, 120, 122, 124, and 126 are each self-contained. Each of unit 116, 118, 120, 122, 124, and 126 comprises a display (e.g., display 330 (FIG. 3)), a controller (e.g., controller 336 (FIG. 3)), and a transceiver (e.g., transceiver 334 (FIG. 3)). In some embodiments, the controller (e.g., controller 336 (FIG. 3)) can be a peripheral interface controller, a programmable interface controller, a microcontroller, or other similar controller. In many embodiments, each of unit 116, 118, 120, 122, 124, and 126 can comprise a power supply (e.g., power supply 332 (FIG. 3)). In many embodiments, each controller (e.g., controller 336 (FIG. 3)) can comprise a discovery and network setup system (e.g., discovery and network setup system 438 (FIG. 4), a pairing system (e.g., pairing system 440 (FIG. 4)), a master selection system (e.g., master selection system 442 (FIG. 4)), and an orphan state system (e.g., orphan state system 444 (FIG. 4).

Figure 3:
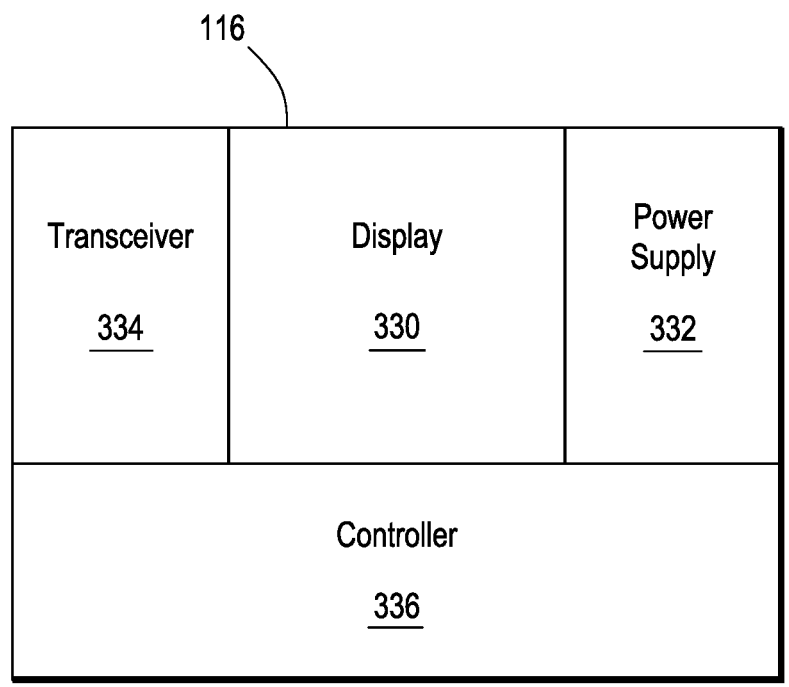
FIG. 3 illustrates a representative block diagram of a unit of the sign system in accordance with the sign system of FIG. 1.
Figure 4:
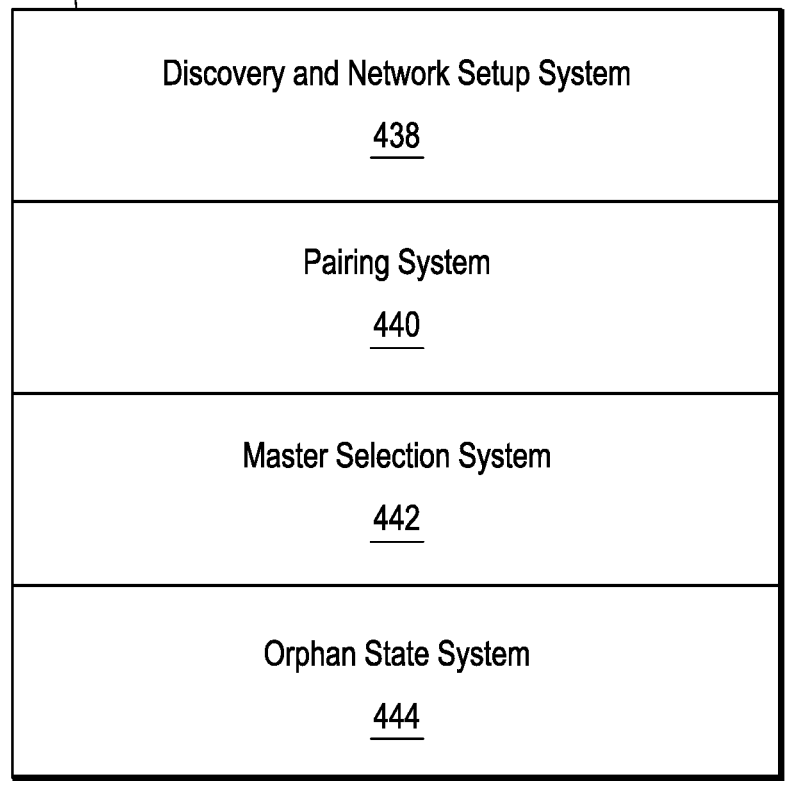
FIG. 4 illustrates a representative block diagram of a controller of the sign system in accordance with the unit of FIG. 3.

Skipping ahead now in the drawings, FIG. 3 illustrates unit 116 of sign 112. In many embodiments, unit 116 can comprise a display 330, a controller 336, a transceiver 334, and a power supply 332. In many embodiments, transceiver 334 can comprise a transmitter and a receiver. In some embodiments, transceiver 334 can be a single integrated unit with the receiver and the transmitter combined together. In some embodiments, transceiver 334 can comprise two separate components: a receiver and a transmitter. In some embodiments, transceiver 334 can comprise a radio. In some embodiments, controller 336 can be referred to as a display controller. In a number of embodiments, controller 336 can be an LED controller that controls a single LED display (e.g., display 330). In some embodiments the single LED display can be a display for a variable message sign (e.g., highway sign, traffic sign, sports sign, fuel price sign, or any other changeable message sign). In some embodiments, the single LED display can be a price display. In many embodiments, the single LED display can comprise a digital height of approximately 8 inches (20.32 centimeters (cm)) to approximately 24 inches (60.96 cm). In some embodiments, the single LED display (e.g., display 330) can comprise a digital height of approximately 30 inches (76.2 cm) to approximately 62 inches (157.48 cm). In some embodiments, controller 336 can be a scroll controller. In various embodiments, the scroll controller can control up to four scroll displays. In some embodiments, controller 336 can comprise a 2X LED controller. In many embodiments, the 2X LED controller can comprise a pair of LED controllers that can control a single LED display (e.g., display 330) with a digital height of approximately 74 inches (187.96 cm) or greater.

Figure 5:
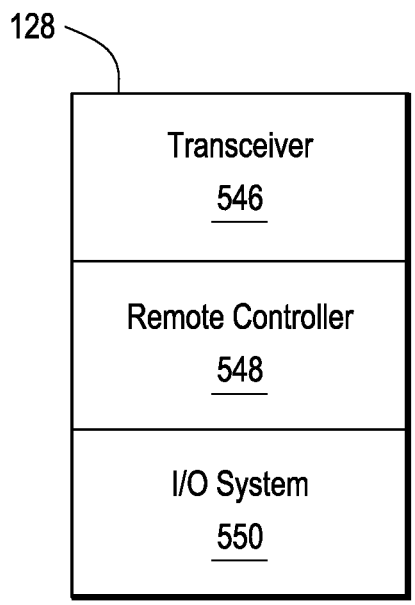
FIG. 5 illustrates a representative block diagram of a control device of the sign system of FIG. 1.

Returning to FIG. 1, in many embodiments, each unit 116, 118, 120, 122, 124, and 126 of sign 112 can have an associated control device 128. In a number of embodiments, control device 128 can comprise a transceiver 546 (FIG. 5), a remote controller 548 (FIG. 5), and an input/output system 550 (FIG. 5). In some embodiments, input/output system 550 (FIG. 5) can comprise a display and a keypad. In some embodiments, input/output system 550 can be integrated into a point of sale system. In some embodiments, control device 128 can comprise a plurality of remote control devices. In various embodiments, control device 128 can comprise a single remote control device. In some embodiments, control device 128 can be a handheld portable clicker. In some embodiments, control device can comprise a store controller. In some embodiments, the store controller can be configured to be communicatively coupled to one or more point of sale systems and sign 112. In some embodiments, the store controller can comprise a user interface. In some embodiments, the user interface is a webpage accessible through an internet or an intranet.

In many embodiments, control device 128 can be used to send information to sign 112 (e.g., pricing information) for display and/or perform configuration tasks for sign system 100. In many embodiments, the configuration tasks can comprise pairing one or more units 116, 118, 120, 122, 124, and 126 with control device 128, displaying signal strength information via indicator light emitting diodes (LEDs), initiating factory reset, troubleshooting, activating features, and/or initiating firmware updates. In some embodiments, control device 128 can control more than one sign. In various embodiments, control device 128 can comprise a user interface, one or more communication interfaces, one or more device interfaces, and a power source. In some embodiments, one of the one or more communication interfaces can comprise a radio. In some embodiments, the user interface can comprise one or more buttons for selecting a unit of the plurality of units, selecting sign 112, and/or inputting information to send to sign 112.

In some embodiments, control device 128 is configured to transmit information to at least one unit of the plurality of units. In some embodiments, the at least one unit of the plurality of units can be a master unit. In many embodiments, the master unit can communicate information to the remaining units of the plurality of units. In some embodiments, the master unit can be referred to as the master controller (e.g., controller 336 (FIG. 3). In some embodiments, only the master unit can communicate with control device 128, and/or each plurality of units has only a single master unit at any point in time. In a number of embodiments, each unit of the plurality of units comprises a master selection system 442 (FIG. 4). In some embodiments, the master unit is selected by master selection system 442 (FIG. 4) based at least in part on radio signal strength from each of the plurality of units 116, 118, 120, 122, 124, and 126 to control device 128. In many embodiments, the unit of the plurality of units 116, 118, 120, 122, 124, and 126 with the highest signal strength can be selected as the master unit. In some embodiments, the unit of the plurality of units with the lowest IP address can be selected as the master unit. If the unit selected as a master unit can no longer serve as the master unity or is no longer suitable to serve as the master unit, then master selection system 442 (FIG. 4) can automatically select a different unit of the plurality of units as the master unit. The detection of whether the unit selected as the master unit can or should continue to serve as the master unity can be performed automatically, as well.

In many embodiments, sign system 100 does not require backplane wiring, customer power supplies, and/or customer programming. In many embodiments, sign system 100 can further comprise a wireless communication system 129. In various embodiments, wireless communication system 129 can be a peer-to-peer wireless network. In many embodiments, the peer-to-peer wireless network can be self-organizing. In many embodiments, the peer-to-peer network comprises at least a portion of the transceivers (e.g., transceiver 334 (FIG. 3)) of the plurality of units. In a number of embodiments, wireless communication system 129 can allow communication between units 116, 118, 120, 122, 124, and 126 (e.g., 129*a*-129*g*). In many embodiments, wireless communication system can allow communication with control device 128. In one embodiment, wireless communication system 129 can comply with the IEEE 802.15.4 communication protocols. In some embodiments, wireless communication system 129 is organized in a star topology. In some embodiments, the star topology comprises at least a portion of the transceivers (e.g., transceiver 334 (FIG. 3)) of the plurality of units.

Figure 2:
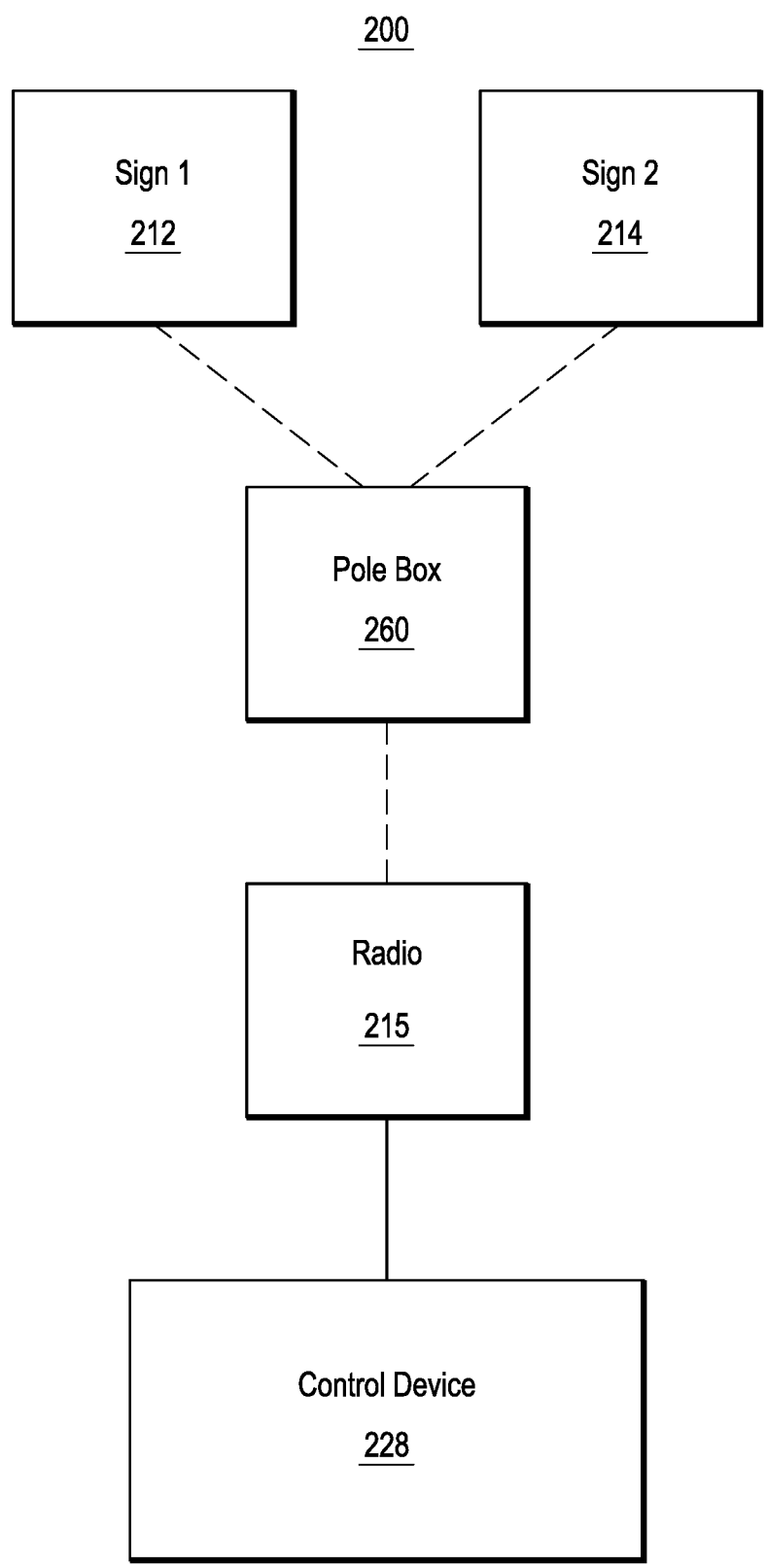
FIG. 2 illustrates a representative block diagram of a sign system in accordance with another embodiment of the invention

FIG. 2 illustrates a sign system 200 according to an embodiment. Sign system 200 is merely exemplary and embodiments of the system are not limited to the embodiments presented herein. Sign system 200 can be employed in many different embodiments or examples not specifically depicted or described herein. In some embodiments, certain elements or modules of sign system 200 can perform various methods and/or activities of those methods. In these or other embodiments, the methods and/or the activities of the methods can be performed by other suitable elements or modules of sign system 200. Generally, therefore, sign system 200 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of sign system 200 described herein.

In many embodiments, sign system 200 can comprise sign 212 and 214. In many embodiments, sign system 200 can comprise one or more signs. In various embodiments, signs 212 and 214 can be similar to sign 112 (FIG. 1). In many embodiments, sign 212 can comprise a first subset of a plurality of units, and sign 214 can comprise a second subset of the plurality of units. In some embodiments, the second subset of the plurality of units is different from the first subset of the plurality of units. In various embodiments, the second subset of the plurality of units does not overlap with the first subset of the plurality of units.

In a number of embodiments, sign system 200 can comprise a control device 228. In some embodiments, control device 228 can be similar to control device 128 (FIG. 1). In many embodiments, control device 228 can be paired to one unit of the plurality of units in the first subset and one unit of the plurality of units in the second subset using a pairing system (e.g., pairing system 440 (FIG. 4)). In some of the same embodiments, control device 228 can be paired to only one unit of the plurality of units in the first subset and only one unit of the plurality of units in the second subset using a pairing system. In many embodiments, sign system 200 can further comprise a radio 215 and/or a pole box 260. In some embodiments, pole box 260 can be integrated with or coupled to a ground cabinet. In various embodiments, pole box 260 can be integral to or located within a first sign (e.g., sign 212). In some embodiments pole box 260 can be optional. In embodiments without pole box 260, radio 215 can communicate directly to with one or more signs 212 and 214. In some embodiments, control device 228 can use radio 215 as an intermediate device to transmit information to one or more signs 212 and 214. In some embodiments, sign 212 (e.g., the first sign) can receive information from control device 228, radio 215, or pole box 260 and then pass the information to sign 214. In many embodiments, radio 215 can be a standard radio (e.g., 2.4 GHz radio or a high powered radio with an antenna) that can be installed in line of sight from sign 212 and/or sign 214. In some embodiments, radio 215 can be a long range radio (e.g., 900 MHz radio). In a number of embodiments, the long range radio can be installed within line of sight of pole box 260. In some embodiments, radio 215 can be a modular radio (e.g. 2.4 GHz mesh radio) that can be installed within line of sight of at least one sign 212 or 214. In some embodiments, the one or more modular radios can form a mesh network.

In some embodiments, pole box 260 can be an intermediate device. In many embodiments, pole box 260 can be installed at the base of a pole of a structure on which sign 212 and/or sign 214 are installed. In various embodiments, pole box 260 can comprise a pole box radio which can be configured to communicate with at least one unit of the plurality of units (e.g., the master unit). In some embodiments, pole box 260 can comprise a high powered radio and a user interface, which can add range to sign system 200. In some embodiments, the user interface of pole box 260 can be used to perform basic configuration or change the display on sign 212 and/or sign 214. In some embodiments, pole box 260 can be configured to add long range radio support, landline modem support, and/or internet protocol modem support.

Figure 6:
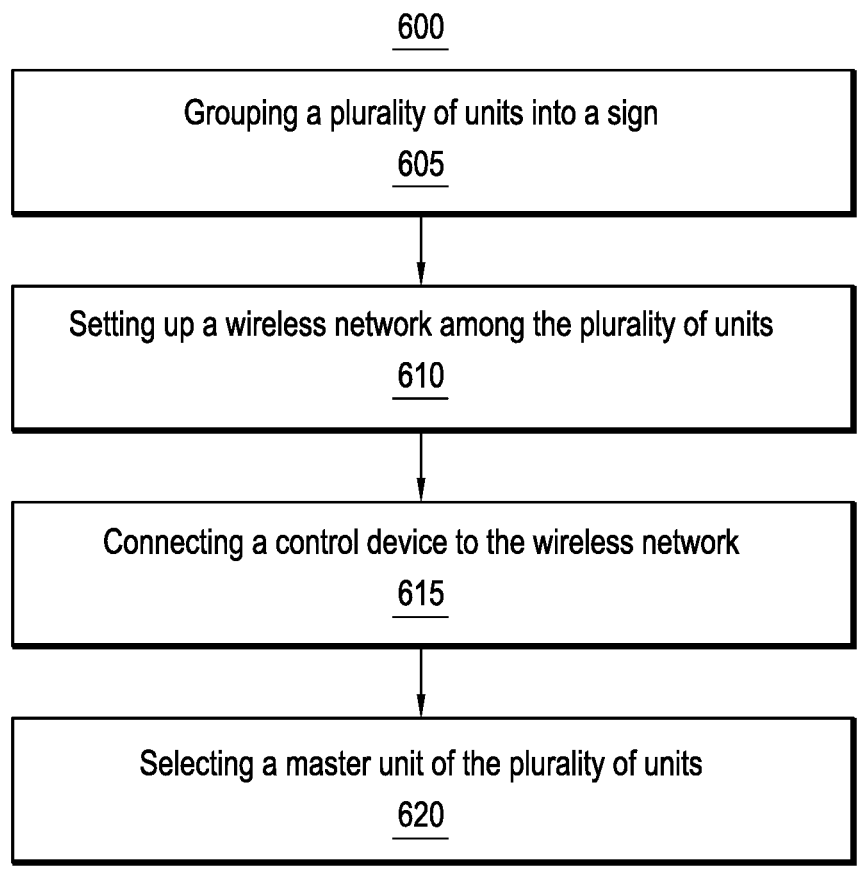
FIG. 6 illustrates a method for configuring a sign system in accordance with an embodiment.

FIG. 6 illustrates a method 600. In many embodiments, method 600 can comprise a method for operating a sign system (e.g., sign system 100 (FIG. 1) and/or sign system 200 (FIG. 2). In some embodiments, method 600 comprises grouping a plurality of units into a sign (block 605), setting up a wireless network among the plurality of units (block 610), connecting a control device to the wireless network (block 615), and selecting a master unit of the plurality of units (block 620). As an example, the control device can be used to select the master unit. In some embodiments, method 600 for operating a sign system can further comprise physically installing the sign and providing each unit of the plurality of units with power. Once the plurality of units are powered on, the plurality of units automatically set up the wireless communication network (e.g., wireless communication network 129 (FIG. 1) using a discovery and network setup system (e.g., discovery and network setup system 438 (FIG. 4)). Once the wireless communication network is established, a star topology can be used. In some embodiments, method 600 can further comprise pairing the control device to the master unit of the plurality of units (e.g., control device 128 (FIG. 1)) using a pairing system (e.g., pairing system 438 (FIG. 4)). In many embodiments, pairing the control device to the master unit of the plurality of units is automatic after the master unit of the plurality of units is selected. In some embodiments, selecting a master unit of the plurality of units (block 620) can comprise determining a signal level strength received from each unit of the plurality of units by the control device (e.g., control device 128 (FIG. 1)).

In many embodiments, method 600 can further comprise determining that a control device is inoperative, and in response to determining that the control device is inoperative, automatically selecting a second control device and automatically pairing the second control device to the master unit of the plurality of units. In many embodiments, the second control device is paired to the master unit of the plurality of units in response to the selection of the second control device. In some embodiments, a pairing system (e.g., pairing system 438 (FIG. 4) can be used to pair second control device to the master unit of the plurality of units. In some embodiments, method 600 can first pair the first control device to a master unit of the plurality of units, and then later determine that the first control device is inoperative. Next, the first control device and the master unit of the plurality of units can be unpaired before the second control device is paired to the master unit of the plurality of units. In other embodiments, the first control device is not paired to the master unit of the plurality of units before the first control device is determined to be inoperative.

In some embodiments, grouping a plurality of units into a sign (block 605) can comprise creating a frame (e.g., frame 127 (FIG. 1)) and placing the plurality of units (e.g., units 116, 118, 120, 122, 124, and 125 (FIG. 1)) in the frame (e.g., frame 127 (FIG. 1)).

In various embodiments, method 600 can further comprise starting a timer when one of the plurality of units loses communication with other units of the plurality of units, determining if the timer exceeds a predetermined threshold, and ceasing display by the one of the plurality of units when the timer exceeds the predetermined threshold. In some embodiments, the predetermined threshold can be approximately 0.5 seconds to approximately 3 minutes. In many embodiments, the predetermined threshold can be 1 second to 10 minutes. In some embodiments, an orphan state system (e.g., orphan state system 444 (FIG. 4)) can be used to reinitiate communication with the plurality of units. In some embodiments, the orphan state system starts the timer when one of the plurality of units loses communication with other units of the plurality of units, determines if the timer exceeds a predetermined threshold, and indicates that the now orphaned unit of the plurality of units is to cease display when the timer exceeds the predetermined threshold. In some embodiments, ceasing display can comprise displaying dashes instead of the previously displayed information.

In many embodiments, method 600 can further comprise adding a new unit to the sign by using the control device to automatically command coupling of the new unit to the plurality of units of the sign. In some embodiments, adding the new unit to the sign system does not require manually rebuilding the sign system and does not require physical user input with other devices or units in the sign system. In many embodiments, a user can issue an electronic command from the control device to add the new unit to the sign system. In many embodiments, the user is not required to perform any physical interactions with any other devices in the sign system. Similarly, in many embodiments, a unit can be replaced without having to manually or physically rebuild the sign system. In some embodiments, when a unit or a group of units is automatically replaced, it can obtain its predecessor's configuration, and the user is not required to intervene to reconfigure the new unit or the new group of units.

In some embodiments, method 600 can further comprise initiating a remote exclusivity function. In many embodiments, when the remote exclusivity function is initiated, the master unit will remove all other paired control devices (except the control device that issued the remote exclusivity command) from the master unit of the plurality of units. In some embodiments, when a store controller issues the remote exclusivity command, all paired control devices will be removed from the master unit of the plurality of units.

The modular sign system with a wireless backplane discussed herein may be implemented in a variety of embodiments, and the foregoing discussion of these embodiments does not necessarily represent a complete description of all possible embodiments. Rather, the detailed description of the drawings, and the drawings themselves, disclose at least one preferred embodiment of a modular sign system with a wireless backplane, and may disclose alternative embodiments of the same.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A variable sign system configured to display information, the variable sign system comprising:
   a plurality of units, wherein each unit of the plurality of units comprises:

a display;
a display controller; and
a transceiver comprising a transmitter and a receiver in communication with the display controller;
a wireless communication system configured to communicate with one or more of the plurality of the units; and
a control device configured to transmit information to at least one of the plurality of units with a radio and a radio signal, wherein the one of the plurality of units is configured to be selectable as a master unit based on one of: i.) a highest radio signal strength between the one or more plurality of units and the control device or ii.) a predetermined unique identifier of the one or more plurality of units.

2. The variable sign system of claim 1, wherein one of the master unit is configured to communicate with the control device with the radio signal.

3. The variable sign system of claim 1, further comprising:
a structure configured to hold at least a subset of the plurality of units together,
wherein the subset of the plurality of units form a single sign, and
wherein the subset of the plurality of units are connected to each other through a wireless network.

4. The variable sign system of claim 1, wherein the wireless communication system comprises a peer-to-peer communication network.

5. The variable sign system of claim 1, wherein the wireless communication system comprises a star topology communication network.

6. The variable sign system of claim 1, wherein the control device is a portable control device.

7. The variable sign system of claim 1, further comprising a pole box, wherein the pole box comprises a pole box radio configured to communicate with at least one unit of the plurality of units.

8. An electronic sign system configured to display information, comprising:
a first sign comprising a first subset of plurality of units, wherein each of the first subset of plurality of units comprises a display, a controller, and a transceiver;
a first wireless network configured to allow communication between the first subset of the plurality of units;
a second sign comprising a second subset of plurality of units, wherein each of the second subset of the plurality of units comprises a display, a controller, and a transceiver;
a second wireless network configured to allow communication between the second subset of the plurality of units;
a control device, wherein the control device is configured to be paired to one of the plurality of units in the first subset and one of the plurality of units in the second subset,
wherein the control device is a portable control device configured to transmit information to at least one of the plurality of units with a radio and radio signal,
wherein one of the plurality of units of the first subset can be selectable to be a master unit based on one of: i.) a highest radio signal strength between one of the plurality of units of the first subset and the portable control device or ii.) a predetermined unique identifier of the one or more plurality of units of the first subset.

9. The electronic sign system of claim 8, wherein the controller of each of the plurality of units comprises a discovery and network setup system.

10. The electronic sign system of claim 8, wherein the controller of each of the plurality of units comprises a pairing system configured to pair the control device with at least one unit of the plurality of units.

11. A method of operating an electronic variable sign system configured to display information, the method comprising:
providing a plurality of units, wherein each unit of the plurality of units comprises:
a display;
a controller;
a transceiver; and
a wireless communication system configured to communicate with one or more of the plurality of the units;
providing a control device;
pairing at least one of the plurality units and the control device; and
selecting one of the plurality of units as a master unit based on a predetermined unique identifier of one of the plurality of units to be selected as the master unit.

12. The method of claim 11, wherein the selecting one of the plurality of units as a master unit the master unit of the plurality of units is automatic after the pairing step.

13. The method of claim 11, further comprising:
determining that a control device is inoperative and in response to determining that the control device is inoperative automatically selecting a second control device; and
automatically pairing the second control device to the master unit.

14. The method of claim 11, further comprising displaying information on the plurality of units.

15. The method of claim 11, further comprising:
monitoring communication between the plurality of units;
starting a timer when one of the plurality of units loses communication with one or more units of the plurality of units;
determining if the timer exceeds a predetermined threshold; and
ceasing display of the information on the one of the plurality of units that has lost communication when the timer exceeds the predetermined threshold.

16. The method of claim 11, further comprising selecting one or more of the plurality of units to form an electronic variable sign and displaying the information on the electronic variable sign.

17. The method of claim 16, wherein the information comprises information indicative of one or more of price of fuel, units, a variable message, and a changeable message.

18. The method of claim 11, wherein the electronic variable sign comprises one of a highway sign, a traffic sign, a sports sign, and a fuel price sign.

* * * * *